United States Patent [19]
Takemura et al.

[11] Patent Number: 5,376,284
[45] Date of Patent: Dec. 27, 1994

[54] METHOD AND APPARATUS FOR TREATING EFFLUENT CONTAINING ORGANIC CHLORINE COMPOUND

[75] Inventors: Yozo Takemura, Tokyo; Kengo Senco, Tokai; Atsushi Mori, Tokai; Osamu Takamori, Tokai; Kenji Watanabe, Tokai; Masao Yashiro, Tokai; Futoshi Matsuo, Tokai, all of Japan

[73] Assignee: Nippon Steel Corporation, Tokyo, Japan

[21] Appl. No.: 979,851

[22] PCT Filed: Jun. 25, 1992

[86] PCT No.: PCT/JP92/00810
§ 371 Date: Feb. 25, 1993
§ 102(e) Date: Feb. 25, 1993

[87] PCT Pub. No.: WO93/00301
PCT Pub. Date: Jan. 7, 1993

[30] Foreign Application Priority Data

Jun. 25, 1991 [JP] Japan ................... 3-178921
Jun. 25, 1991 [JP] Japan ................... 3-178922
Jun. 25, 1991 [JP] Japan ................... 3-178923

[51] Int. Cl.$^5$ ............................... C02F 1/72
[52] U.S. Cl. .................. 210/759; 210/188; 210/194; 210/206; 210/218; 210/221.2; 210/765; 210/908; 422/222; 422/231; 422/234
[58] Field of Search .......... 210/759, 763, 908, 765, 210/750, 194, 188, 205, 206, 209, 220, 221.1, 221.2, 218; 422/222, 231, 234

[56] References Cited

U.S. PATENT DOCUMENTS 4,784,775 11/1988 Hardison .................. 210/763
5,116,515 5/1992 Selesnick ................. 210/188

FOREIGN PATENT DOCUMENTS 0431932 6/1991 European Pat. Off. .
2703268 8/1978 Germany .
50-136947A 10/1975 Japan .
91094 8/1978 Japan .................. 210/763
99657 8/1978 Japan .................. 210/763
113168 10/1978 Japan .................. 210/763
63-158188A 7/1988 Japan .
3-101893 4/1991 Japan .
3-31120 5/1991 Japan .
3114589A 5/1991 Japan .
4100593A 4/1992 Japan .

OTHER PUBLICATIONS

Data Base WPIL, Section Ch, Week 9220, Derwent Publications Ltd., London, GB, Class D15, AN9-2-162574.
Supplementary European Search Report, EP 92 91 3995.
Yogyo Yousui (Industrial Water), published Apr., 1991, vol. 391, pp. 29-35 and 28.
PPM, published Feb., 1977, pp. 30-38.

Primary Examiner—Neil McCarthy
Attorney, Agent, or Firm—Kenyon & Kenyon

[57] ABSTRACT

A method and apparatus for the treatment of an effluent containing an organic chlorine compound in the presence of a porous iron type metallic article and hydrogen peroxide thereby effecting oxidizing decomposition of the organic chlorine compound, operated by a procedure which comprises causing the organic chlorine compound having hydrogen peroxide incorporated preparatorily therein to be circulated through a closed vessel having the porous iron type metallic article disposed therein thereby effecting oxidizing decomposition of the organic chlorine compound and then simultaneously circulating and aerating the effluent containing the organic chlorine compound under the condition of keeping the upper part of the closed vessel in an opened state thereby effecting oxidizing decomposition of the organic chlorine compound or causing the gaseous phase stagnating in the upper part of the vessel to be introduced into the effluent.

10 Claims, 4 Drawing Sheets

METHOD AND APPARATUS FOR TREATING EFFLUENT CONTAINING ORGANIC CHLORINE COMPOUND

DESCRIPTION

1. Technical Field

The present invention relates to a method and apparatus for treating an effluent (or waste water) containing an organic chlorine compound such as, for example, an effluent containing trichloroethylene, tetrachloroethylene, etc.

2. Background Art

The effluent containing organic chlorine compounds such as trichloroethylene and tetrachloroethylene is subject to various government regulations enacted for the conservation of the environment. Thus, the desirability of establishing a highly advanced technique for the treatment of such an effluent as mentioned above has been finding growing recognition.

As conventional means for treating such effluents containing organic chlorine compound, the method of aeration using an aerating tank, the method of diffusion using a packed column, the method of adsorption using activated carbon, and the method of suitably combining the above mentioned methods have been known in the art.

Further, the method of treating an effluent containing an oxidizable substance by the action of a Fenton's reagent has been known in the art as disclosed in Japanese Unexamined Patent Publication No. 50-136947 and No. 63-158188 for example.

The aeration method, diffusion method, adsorption method, etc., mentioned above, however, are invariably methods of physical treatment and require giving to the substance such as, for example, the activated carbon which is entraining the organic chlorine compound seized from the treated effluent, a secondary treatment capable of rendering the treated effluent harmless. Thus, these methods have many difficulties from the standpoint of management of the treatment such as, for example, watching for the time at which the adsorbing ability of the activated carbon is entirely lost and consequently allowing the exhausted activated carbon to be replaced with a new supply.

When the Fenton reaction is utilized when a divalent ion compound such as $FeSO_4$ is used, the reaction of $Fe^{++}$ ion with $H_2O_2$ occurs very suddenly. Since the effluent generally contains an organic chlorine compound in an extremely low concentration on the order of some tens of ppm to some hundreds of ppm, this divalent ion compound is substantially released in the form of oxygen gas rather than being consumed in the oxidation of the organic chlorine compound.

For the organic chlorine compound to be removed by oxidation from the effluent, therefore, $H_2O_2$ and $FeSO_4$ must be added in large amounts to the effluent. As a result, though the added reagents satisfactorily deprive the effluent of the organic chlorine compound, they persist in the remaining effluent and entail the disadvantage that the treatment of this effluent for removal of COD and Fe ion and the treatment thereof for pH adjustment require much time and labor.

In the Fenton reaction using such a trivalent Fe ion such as $Fe_2(SO_4)_3$, although the trivalent Fe ion does not cause under such a sudden reaction as experienced by the divalent Fe ion, it is hardly soluble in water and, therefore, must be dissolved in an acid prior to use. Thus, the treated effluent necessitates the same time-consuming elaborate treatments for removal of COD and Fe ion and for pH adjustment as in the case of the divalent Fe ion.

DISCLOSURE OF THE INVENTION

Thus, the present invention, intended to eliminate the problems of the conventional techniques mentioned above and initiated by the interest taken in the method of treating an effluent containing an organic chlorine compound with a porous iron type metallic article and hydrogen peroxide, provides a method and apparatus for effecting oxidizing decomposition and removal of the organic chlorine compound more efficiently.

In accordance with the first aspect of the present invention, there is provided a method for treating an effluent containing an organic chlorine compound in the presence of a porous iron type metallic article and hydrogen peroxide thereby effecting oxidizing decomposition of the organic chlorine compound, which method comprises a first step of circulating the effluent containing the organic chlorine compound incorporating therein hydrogen peroxide through a closed vessel having the porous iron type metallic article disposed therein thereby effecting the oxidizing decomposition, and a second step of subsequently continuing the circulation of the effluent containing the organic chlorine compound and, at the same time, aerating this effluent under the condition of keeping the upper part thereof opened thereby effecting the oxidizing decomposition of the organic chlorine compound.

The present invention enables the effluent containing the organic chlorine compound to be treated efficiently by causing the organic chlorine compound remaining in an extremely small amount in the effluent to be adsorbed and decomposed in the upper open part of the closed vessel in the second step.

In accordance with the first aspect of the present invention, there is provided an apparatus for the treatment of an effluent containing an organic fluorine compound, which comprises a tightly closable vessel, a porous iron type metallic article disposed in the vessel, a circulating path disposed inside the vessel under the surface of the effluent held in the vessel, an aerating device disposed on the lower surface side of the porous iron type metallic article, and a gas discharge conduit disposed in the upper part of the vessel and provided with a switch valve.

In accordance with the second aspect of the present invention, there is provided a method for treating an effluent containing an organic chlorine compound in the presence of a porous iron type metallic article and hydrogen peroxide thereby effecting oxidizing decomposition of the organic chlorine compound, which method comprises disposing the porous iron type metallic article in a closed vessel and, at the same time, placing in the closed vessel the effluent containing the organic chlorine compound having hydrogen peroxide incorporated preparatorily therein and causing a gaseous phase stagnating above the effluent inside the closed vessel to be introduced into the effluent thereby effecting oxidizing decomposition of the organic chlorine compound.

The present invention, subsequently to the treatment for oxidizing decomposition mentioned above, enables the effluent containing the organic chlorine compound to be treated efficiently by causing the effluent containing the organic chlorine compound to be aerated and, at the same time, submitted to oxidizing decomposition under the condition of keeping the upper part of the closed vessel opened, and further enables the effluent containing the organic chlorine compound to be treated efficiently by further circulating the effluent through the closed vessel thereby effecting oxidation of the organic chlorine compound.

In accordance with the second aspect of the present invention, there is provided an apparatus for the treatment of an effluent containing an organic chlorine compound, which comprises a tightly closable vessel, a porous iron type metallic article disposed in the vessel, a circulating path disposed inside the vessel and adapted to circulate a gaseous phase occurring above the surface of the effluent under treatment placed in the vessel into the effluent, an aerating device disposed on the lower surface side of the porous iron type metallic article, and a switch valve-containing gas discharge conduit and a hydrogen peroxide adding device both disposed in the upper part of the vessel.

In accordance with the third aspect of the present invention, there is provided a method for treating an effluent containing an organic chlorine compound in the presence of a porous iron type metallic article and hydrogen peroxide thereby effecting oxidizing decomposition of the organic chlorine compound, which method comprises causing forced circulation of the effluent containing the organic chlorine compound stored in a tightly closable vessel and, at the same time, enabling a gaseous phase consisting mainly of a gas containing an organic chlorine compound and occurring in the closed vessel to be circulated into the effluent by utilizing the force of the forced circulation of the effluent mentioned above thereby effecting the oxidizing decomposition of the effluent containing the organic chlorine compound.

In accordance with the third aspect of the present invention, there is provided an apparatus for treating an effluent containing an organic chlorine compound which comprises a tightly closable vessel, a porous iron type metallic article disposed in the closed vessel, a circulating conduit for the effluent under treatment and a circulating conduit for a gaseous phase formed mainly of a gas containing an organic chlorine compound so disposed as to have one-side terminals thereof opened respectively into the gaseous space above the surface of the effluent stored in the closed vessel and into the effluent, a pump inserted in the circulating conduit for the effluent, an ejector inserted in the circulating conduit for the effluent on the downstream side from the pump and adapted to allow connection thereto of the other terminal of the circulating conduit for the gaseous phase, and an aerating pipe disposed below the porous iron type metallic article inside the vessel and connected to the ejector.

The present invention allows the effluent containing the organic chlorine compound to be efficiently treated by connecting to a point in the entire length of the circulating conduit for the gaseous phase a gas feed pipe which is provided with a check valve and a switch valve.

BEST MODE FOR EMBODYING THE INVENTION

Figure 1:
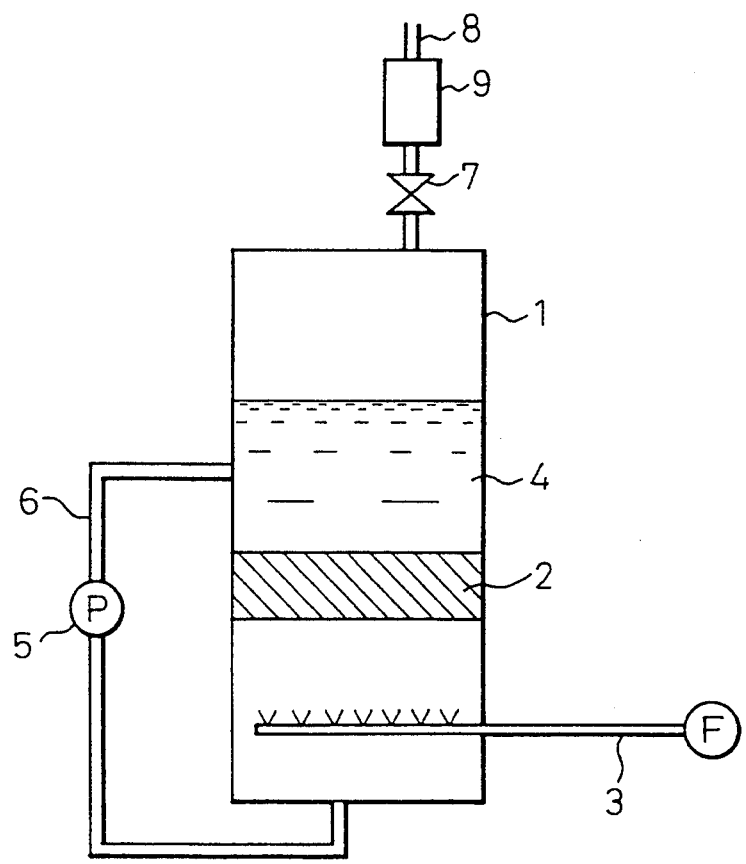
FIG. 1 is an explanatory type diagram illustrating an apparatus for embodying the first aspect of the present invention.

It has been disclosed in Japanese Patent Application No. 2-249008 that when water containing an organic chlorine compound such as, for example, tetrachloroethylene is caused to contact a porous iron type metallic article, this organic chlorine compound can be decomposed and removed by the following reaction which is induced by the reduction of Fe.

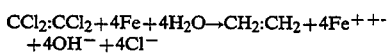

It has been disclosed in Japanese Patent Application No. 2-214,289 that when the effluent containing the organic chlorine compound is left reacting in the co-presence of a porous iron type metallic article and hydrogen peroxide, this organic chlorine compound can be decomposed and removed within a relatively short span of time.

(1) Reaction of reducing decomposition between the porous iron type metallic article formed mainly of iron as a reducing metal and tetrachloroethylene;

$$CCl_2{:}CCl_2 + 4Fe + 4H_2O \rightarrow CH_2{:}CH_2 + 4Fe^{++} + 4OH^- + 4Cl^-$$

(2) Reaction of oxidizing decomposition by Fenton reaction between $H_2O_2$ and formed $Fe^{++}$ ion;

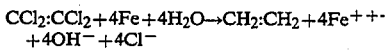

(3) Reaction of oxidizing decomposition by the Fenton reaction of $Fe^{++}$ occurring in consequence of the oxidation of the porous iron type metallic article with $H_2O_2$;

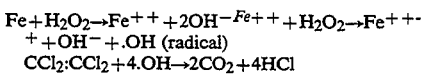

It is inferred that since the reaction of reduction and the reaction of oxidation of (1)–(3) proceed simultaneously and the speed of formation of $Fe^{++}$ ion in the reaction of (1) and that of $Fe^{+++}$ ion in the reactions of (2) and (3) are very slow as compared with the speed of formation of $Fe^{++}$ ion due to direct addition of $FeSO_4$, for example, to the effluent, the efficient Fenton reaction of oxidizing decomposition of the organic chlorine compound proceeds instead of such a sudden reaction as $FeSO_4+H_2O_2$ and, as a result, the treated effluent exhibits COD, Fe ion concentration, etc., at extremely low magnitudes.

The present inventors have continued various studies in search of a way of further expediting the reaction disclosed in the specification of Japanese Patent Application No. 2-214289 to find the phenomenon where the Fenton reaction of oxidizing decomposition of organic chlorine mentioned above proceeds stably at a relatively high speed for a certain length of time and then begins to stagnate. Even when such additive means as aeration and stirring which are capable of promoting the Fenton reaction of oxidizing decomposition of organic chlorine mentioned above is adopted, the phenomenon that the reaction stagnates after the elapse of the duration mentioned above is observed.

The inventors, based on this knowledge, have further found that the organic chlorine compound can be substantially entirely decomposed and removed at a heretofore unattainable high speed by combining a specific time zone and specific means which enable the reaction to proceed stably and relatively quickly.

To be specific, the treatment of an effluent containing an organic chlorine compound in the presence of a porous iron type metallic article and hydrogen peroxide for effecting oxidizing decomposition of the organic chlorine compound is attained by a method which comprises placing the porous iron type metallic article in a closed vessel and circulating through this closed vessel the effluent containing the organic chlorine compound having hydrogen peroxide incorporated preparatorily therein thereby effecting the oxidizing decomposition as a first step, and subsequently continuing the circulation of the effluent containing the organic chlorine compound through the closed vessel under the condition of keeping the upper part of the closed vessel opened thereby additionally inducing aeration of the effluent under treatment (the first aspect of the present invention).

The present inventors have continued various further studies in search of a way of expediting the reaction disclosed in the specification of Japanese Patent Application No. 2-214289 to acquire a knowledge that the organic chlorine compound is vaporized to give rise to a gaseous phase of a gas containing an organic chlorine compound within the vessel during the course of the Fenton reaction for oxidizing decomposition of the organic chlorine mentioned above and, with a slight time lag behind the progress of the treatment of the effluent for the Fenton oxidation of the organic chlorine, the gas containing the organic chlorine compound emanating from the gaseous phase is redissolved into the effluent. It is logically redissolved into the effluent. It is logically concluded that the behavior of the vaporization of the organic chlorine compound from the liquid phase and the behavior of the dissolution of the gas containing the organic chlorine compound from the gaseous phase into the liquid phase bring about a delay in the Fenton reaction in the entire system.

Based on the knowledge just mentioned, the present inventors have further found that quick oxidizing decomposition and removal of the organic chlorine compound can be attained by positively causing the gas containing the organic chlorine compound in the gaseous phase to be fed into the system of the Fenton reaction.

To be more specific, the treatment of the effluent containing the organic chlorine compound in the presence of the porous iron type metallic article and hydrogen peroxide for effecting oxidizing decomposition of the organic chlorine compound is attained by a method which comprises disposing the porous iron type metallic article in a closed vessel and, at the same time, placing in the closed vessel the effluent containing the organic chlorine compound having hydrogen peroxide preparatorily incorporated therein and causing a gaseous phase which stagnates on the effluent inside the closed vessel to be introduced into the effluent (the second aspect of the present invention).

The circulation of the gaseous phase of the gas containing the organic chlorine compound in the present invention just mentioned brings about the action of inducing direct contact of the gas with the Fenton reaction system and at the same time, stirring the effluent containing the organic chlorine compound.

The third aspect of the present invention which is based on the knowledge mentioned above consists in the knowledge that the oxidizing decomposition and removal of the organic chlorine compound in the effluent can be expedited by continuing the forced enabling the gas containing the organic chlorine compound in the gaseous phase to be positively fed by circulation into the Fenton reaction system by utilizing the force of the forced circulation of the effluent mentioned above.

To be more specific, the treatment of the effluent containing the organic chlorine compound in the presence of the porous iron type metallic article and hydrogen peroxide for effecting oxidizing decomposition of the organic chlorine compound is attained by a method which comprises continuing the forced circulation of the effluent containing the organic chlorine compound mentioned above stored in a tightly closable vessel and, at the same time, enabling the gaseous phase formed mainly of the gas containing the organic chlorine compound occurring in the closed vessel to be circulated into the effluent by utilizing the force of the forced circulation of the effluent mentioned above (the third aspect of the present invention).

The forced circulation of the effluent under treatment in the present invention just mentioned accelerates the Fenton reaction and the circulation of the gaseous phase of the gas containing the organic chlorine compound brings about the action of inducing direct contact of the gas with the Fenton reaction system and, at the same time, stirring the effluent containing the organic chlorine compound, and accelerating the Fenton reaction.

The porous iron type metallic article to be used in the present invention has iron as a main component and may additionally incorporate therein a metal such as Cu, Cr, Ni, Sn, or Zn which is capable of enhancing the corrosionproofness of iron.

The shapes which the porous article of the present invention is allowed to assume include molded spheres, columnar laminates, porous plates and laminates thereof, fibers, honeycombs, and carriers obtained by applying an iron type metallic powder to obtained by applying an iron type metallic powder to three-dimensionally shaped urethane foam articles, and articles obtained by sintering the carriers, for example.

Although the amount of hydrogen peroxide to be used in the reaction is variable with the amount of the organic chlorine compound in the effluent or other coexisting ion, it is generally sufficient in a range between 0.05 and 2.00% by weight, based on the amount of the effluent to be treated.

The treatment contemplated by the present invention may be carried out by first causing the effluent containing the organic chlorine compound in the closed vessel to contact the porous iron type metallic article thereby effecting primary treatment of the organic chlorine compound by reducing decomposition and then adding hydrogen peroxide to the system of the primary treatment thereby effecting secondary treatment of the organic chlorine compound by oxidizing decomposition.

When the metallic iron is caused to contact the effluent containing the organic chlorine compound, the organic chlorine compound is decomposed by reduction and, at the same time, the Fe++ ion concentration is changed to some tens of ppm. When $H_2O_2$ is added to the resultant reaction system, it can be utilized for the oxidizing decomposition of the organic chlorine compound by the Fenton reaction of Fe ion with $H_2O_2$ which occurs preferentially over the reaction of the metallic iron with $H_2O_2$.

According to the first aspect of the present invention, the gas containing the organic chlorine compound separates from the effluent containing the organic chlorine compound and floats up in the closed vessel. When the content of the organic chlorine compound in the effluent decreases in proportion as the oxidizing decomposition of the organic chlorine compound in the effluent advances in consequence of the Fenton reaction mentioned above, the organic chlorine compound in the gas passes and dissolves in the effluent. Thus, the organic chlorine compound in the closed vessel is submitted to the oxidizing decomposition until the amount of the organic chlorine compound in the effluent and the amount of the organic chlorine compound in the gas are substantially equalized.

The first step mentioned above causes the Fenton reaction to advance until the organic chlorine compound concentration in the effluent falls not more than 10 mg/liter.

When this first step is completed, the effluent containing the organic chlorine compound is circulated and, at the same time, subjected to aeration under the condition of keeping the upper part of the closed vessel open to effect the oxidizing decomposition of the organic chlorine compound until the organic chlorine compound concentration in the effluent falls not more than 0.1 mg/liter. The aerating gas or the air to be fed into the system for the sake of the aeration mentioned above is discharged from the closed vessel through the open end formed in the upper end of the vessel. The spent aerating gas discharged through the open end entrains the organic chlorine compound gas only in a very minute amount allowable in accordance with environmental regulations. For the sake of substantially perfect elimination of the organic chlorine compound gas from the departing spent gas, an adsorbing agent such as, for example, activated carbon, a porous iron type metallic article, or silica gel may be placed in the gas discharging conduit so that the organic chlorine compound gas will be adsorbed out of the spent gas. Since the amount of the organic chlorine compound contained in the spent gas is extremely small, the activated carbon is allowed to function effectively for a long time.

According to the second aspect of the present invention, the organic chlorine compound is subjected to the gaseous-phase circulation method using the first and the second treatment as mentioned above so that the Fenton reaction of the effluent containing the organic chlorine compound induces the oxidizing decomposition of the organic chlorine compound and consequently lowers the concentration thereof below the tolerable level fixed by the environmental regulations.

According to the second aspect of the present invention, after the organic fluorine compound content in the effluent has been decreased to a stated concentration such as, for example, not more than 10 mg/liter, the effluent containing the organic chlorine compound is aerated under the condition of keeping the upper part of the closed vessel opened so as to expedite the oxidizing decomposition of the organic chlorine compound owing to the Fenton reaction which proceeds quickly.

The efficiency of the oxidizing decomposition declines in proportion as the organic chlorine compound concentration in the effluent decreases. In order for the treatment of oxidizing decomposition to lower the organic chlorine compound content of the effluent to 0.1 mg/liter or less, a long time is required.

The Fenton reaction mentioned above is accelerated by subjecting the effluent under treatment to forced stirring by aeration. The aerating gas or the air which is fed into the system for the purpose of the aeration mentioned above, on being spent in the aeration, is discharged from the closed vessel via the open end formed in the upper part of the closed vessel. The spent aerating gas departing from the open end of the closed vessel entrains the organic chlorine compound gas only in an extremely minute amount allowable in accordance with environmental regulations. For the sake of substantially perfect elimination of the organic chlorine compound gas from the departing spent gas, an adsorbing agent such as, for example, activated carbon, a porous iron type metallic article, or silica gel may be installed at a point in the entire length of the gas discharging conduit so that the organic chlorine compound gas will be adsorbed out of the spent gas. Since the amount of the organic chlorine compound contained in the spent gas is extremely small, the activated carbon is allowed to function effectively for a long time.

According to the third aspect of the present invention, the treatment for oxidizing decomposition of the effluent containing the organic chlorine compound by the gaseous-phase circulation method utilizing the force of the forced circulation of the effluent under treatment is capable of not merely decreasing the content of the organic chlorine compound below the tolerable level fixed in accordance with environmental regulations but also cutting the expense of the motive force for operation.

Another aspect of the present invention consists in expediting the oxidizing decomposition owing to the Fenton reaction by aerating the effluent containing the organic chlorine compound under the condition of keeping the upper part of the closed vessel opened after the organic chlorine compound content in the effluent under treatment has been lowered below a fixed level such as, for example, to not more than 10 mg/liter.

The efficiency of the oxidizing decomposition declines proportionally as the organic chlorine compound concentration in the effluent under treatment decreases. In order for the treatment of oxidizing decomposition to lower the concentration of the organic chlorine compound in the effluent not more than 0.1 mg/liter, a long time is required.

The Fenton reaction mentioned above is accelerated by subjecting the effluent under treatment to forced stirring by aeration.

The aerating gas or the air, on being spent in the aeration mentioned above, is discharged from the closed vessel via the open end formed in the upper part of the closed vessel. The spent aerating gas departing from the open end of the closed vessel entrains the organic chlorine compound gas only in an extremely minute amount allowable in accordance with environmental regulations. For the sake of substantially perfect elimination of the organic chlorine compound gas from the departing spent gas, an adsorbing agent such as, for example, activated carbon, a porous iron type metallic article, or silica gel may be placed in the gas discharging conduit so that the organic chlorine compound gas will be adsorbed out of the spent gas. Since the amount of the organic chlorine compound contained in the spent gas is extremely small, the activated carbon is allowed to function effectively for a long time.

FIG. 1 is an explanatory model diagram illustrating an apparatus for executing the first aspect of the present invention. In a closed vessel 1, a porous iron type metallic article 2 is set in place and an aerating device 3 is disposed in the bottom part of the vessel 1 below the porous iron type metallic article 2.

In the vessel 1, an effluent 4 containing an organic chlorine compound which is a waste water under treatment is stored in a prescribed volume. To the wall surface of the vessel 1 below the surface of the effluent 4 under treatment, one terminal of a circulating path 5 provided with a pump for circulating the effluent 4 under treatment is connected. The other terminal of the circulating path 5 is connected to the bottom part of the vessel 1. To the upper terminal part of the vessel 1 is connected a gas discharge pipe 8 which is provided with a switch valve 7. The gas discharge pipe 8 is provided on the downstream side of the switch valve 7 with an empty part 9 which is capable of accommodating an adsorbing agent (not shown). In the apparatus for treatment constructed as mentioned above, the first step of the method of the first aspect of the present invention, i.e., the treatment of the effluent 4 under treatment for oxidizing decomposition, can be carried out by shutting the switch valve 7 of the vessel containing the effluent 4 containing the organic chlorine compound incorporating hydrogen peroxide therein, keeping the aerating device 3 in a suspended state, and then actuating the pump 6.

After the first step mentioned above is completed, the second step of the present invention, i.e., the circulation and aeration of the effluent 4 under treatment for the treatment of oxidizing decomposition of the organic chlorine compound can be carried out by opening the switch valve 7 and actuating the aerating device 3. When the apparatus is operated with the empty place 9 packed with an adsorbent agent such as, for example, silica gel, a porous iron type metallic article, or activated carbon, the organic chlorine compound contained in a very minute amount in the discharged gas is adsorbed for the treatment of oxidizing decomposition during the course of the second step of the first aspect of the present invention.

Now, a specifical example of the apparatus of treatment contemplated by the present invention will be described hereinbelow with reference to FIG. 2.

In the diagram, 1 stands for a tightly closable vessel. In the vessel 1, a porous iron type metallic article 2 is set in place. An aerating device 3 is disposed in the bottom part of the vessel 1 below the porous iron type metallic article 2. Air, nitrogen gas, etc., can be used as the aerating gas.

In the vessel 1, an effluent 4 containing an organic chlorine compound which is a waste water under treatment is stored in a prescribed amount. To the wall surface of the vessel 1 below the surface of the effluent 4 under treatment is connected one terminal of a circulating path 5 which is provided with a pump 6 for circulating the effluent 4 under treatment. The other terminal of the circulating path 5 is connected to the bottom part of the vessel 1. A gas discharging pipe 8 provided with a switch valve 7 is connected to the upper terminal part of the vessel 1. The gas discharge pipe 8 is provided on the downstream side of the switch valve 7 with an empty part 9 which is capable of being packed with an adsorbing agent (not shown).

To the circulating path 5 on the downstream side of the pump 6, an effluent conduit 12 of a master liquid separating tank 11 is connected through the medium of a three-way valve 10 to give rise to a path for feeding the effluent under treatment to the vessel 1. A hydrogen peroxide adding device 13 for storing hydrogen peroxide in an amount required for the treatment for oxidizing decomposition is provided in the upper terminal part of the vessel 1. This device 13 is provided with a switch valve 14, which may be either switched at prescribed intervals to effect intermittent addition of hydrogen peroxide of a fixed amount or kept open by a prescribed degree to effect continuous addition of hydrogen peroxide at a prescribed rate.

The vessel 1 may be provided in the upper terminal part thereof with a safety valve 15. On the lateral part of the vessel 1 above the porous iron type metallic article 2, a water discharge pipe 17 provided with a switch valve 16 is set in place. By having the water discharge pipe 17 installed above the porous iron type metallic article 2, the oxidation of the porous iron type metallic article 4 possibly caused when the apparatus is intermittently operated for the treatment of the effluent 4 can be curbed. A tubular path 18 is a draining vent which is provided with a filter 19.

The present apparatus is suitable for the treatment of an effluent from dry cleaning in which the effluent occurs in an amount in the range between 1 and 10 liters/day and contains tetrachloroethylene in a concentration of about 50 mg/liter. The amount of hydrogen peroxide which is used sufficiently for the treatment is in a range between 0.05 and 2% by weight, based on the amount of the effluent under treatment.

Now, the apparatus for treatment to be used in executing the second aspect of the present invention will be described below with reference to FIG. 3.

In the diagram, 21 stands for a tightly closable vessel. In the vessel 21, a porous iron type metallic article 22 is set in place. An aerating device 23 is set in place in the bottom part of the vessel 21 below the porous iron type metallic article 22. Air, nitrogen gas, etc., may be used as the aerating gas.

In the vessel 21, an effluent 24 containing an organic chlorine compound which is a waste water under treatment is stored in a prescribed amount. To the wall surface of the vessel 21 above the surface of the effluent 24 under treatment is connected one terminal of a circulating path 27 which is provided with a pump for circulating a gaseous phase 24 formed mainly of a gas containing an organic chlorine compound vaporized from the effluent under treatment. The other terminal of the circulating path 27 is connected to the aerating device 23 through the medium of a three-way valve 28.

The circulating path 27 and the aerating device 23 may be independently provided with a pump 26 so as to be independently operated. In the diagram, 29 stands for a mater liquid separating tank. The effluent 24 for treatment which has been separated by virtue of specific gravity in the master liquid separating tank 29 is fed to the vessel 21 through the medium of a tubular path 31 which is provided with a pump 30.

To the tubular path 31 on the upstream side of the pump 30 is connected one terminal of a pipe 33 through the medium of a three-way valve 32. The other terminal of this pipe 33 is connected to the vessel 21 below the surface of the effluent 24 under treatment. The pipe 33, three-way valve 32, pump 30, and tubular path 31 jointly form a path for the circulation of the effluent 24 under treatment inside the vessel 21. This path for circulation may be caused to function either during the treatment for oxidizing decomposition of the effluent under continued circulation of the gaseous phase mentioned above or during the treatment for oxidizing decomposition under continued aeration with the upper part of the vessel 21 kept open.

To the upper part of the vessel 21 is connected a gas discharge pipe 35 which is provided with a switch valve 34. The gas discharge pipe 35 is provided halfway in the length thereof with an empty place 36 which is capable of being packed with an adsorbing agent such as, for example, activated carbon. This gas discharge pipe 35 functions when the treatment for oxidizing decomposition of the effluent 24 is performed simultaneously with the treatment of aeration. When this treatment of aeration is carried out simultaneously with the treatment of oxidizing decomposition, the organic chlorine compound gas which is contained in a very minute amount in the gaseous phase can be discharged from the system via the gas discharge pipe 35. For the sake of substantially perfect elimination of the organic chlorine compound gas from the gas discharged from the system, the empty place 36 may be charged with an adsorbing agent such as, for example, activated carbon, a porous iron type metallic article, or silica gel.

The vessel 21 is provided on the upper part thereof with a hydrogen peroxide adding device 37 for storing hydrogen peroxide in an amount required for the treatment for oxidizing decomposition.

This device 37 is provided with a switch valve 38, which may be either switched at prescribed intervals to effect intermittent addition of hydrogen peroxide of a prescribed amount or kept open at a prescribed degree to effect virtually continuous addition of hydrogen peroxide at a prescribed rate. A safety valve 39, a level gauge 40, and a water discharge pipe 41 provided with a switch valve 42 are disposed as illustrated. Owing to the fact that the water discharge pipe 41 is disposed above the position at which the porous iron type metallic article 22 is set in place inside the vessel 21, the oxidation of the porous iron type metallic article possibly caused when the apparatus is operated intermittently for the treatment of the effluent 24 can be curbed. By 43 is denoted a drain vent which is provided with a filter 44.

The present apparatus is suitable for treating the effluent from dry cleaning in which the effluent occurs in an amount in the range between 1 and 10 liters/day and contains tetrachloro-ethylene in a concentration of about 50 mg/liter. The amount of hydrogen peroxide to be added sufficiently for the treatment is in a range between 0.05 and 2% by weight, based on the amount of the effluent under treatment.

Now, the apparatus for treatment to be used for executing the third aspect of the present invention will be described below with reference to FIG. 4.

The reference numeral 45 stands for a tightly closable vessel. In the vessel 45, a porous iron type metallic article 46 is set in place. An aerating pipe 47 is set in place in the bottom part of the vessel 45 below the porous iron type metallic article 46. In this vessel 45, the effluent containing an organic chlorine compound 48 is stored in a prescribed amount.

To the vessel 45 above the surface of the effluent 48 under treatment, one terminal of a circulating path 50 for circulating a gaseous phase 49 is connected.

To the vessel 45 below the surface of the effluent 48 under treatment, one terminal of a circulating path 51 for circulating the effluent 48 under treatment is connected.

The circulating path 51 is provided at a point along the entire length thereof with a pump 52. An ejector 53 is set in place at the terminal part of the circulating path 51 on the downstream side of the pump 52. This ejector 53 is connected to the aerating pipe 47 mentioned above.

To the lateral part of this ejector 53 is connected the other terminal of the gaseous-phase circulating path 50.

The vessel 45 is provided on the upper part thereof with a hydrogen peroxide adding device 54 for storing hydrogen peroxide in an amount required for the treatment for oxidizing decomposition.

This device 54 is provided with a switch valve 55, which may be either switched at prescribed intervals to effect intermittent addition of hydrogen peroxide in a prescribed amount or kept open at a prescribed degree to effect virtually continuous addition of hydrogen peroxide in a prescribed rate. Reference numeral 56 stands for a safety valve.

In the apparatus for treatment constructed as mentioned above, for the treatment of the effluent containing the organic chlorine compound, the vessel 45 is charged with the effluent 48 as prescribed above and then the pump 52 is actuated. As a result, the effluent 48 under treatment is submitted to forced circulation, the gaseous phase 49 is set circulating, and the treatment for oxidizing decomposition is allowed to proceed effectively inside the vessel 45.

An aerating gas aspirating pipe 59 provided with a check valve 57 and a switch valve 58 is connected to a point falling halfway along the entire length of the gaseous-phase circulating path 50 of the apparatus for treatment mentioned above. To the upper part of the vessel 45 is connected a gas discharge pipe 61 which is provided with a switch valve 60. In the apparatus thus completed, the treatment for oxidizing decomposition mentioned above can be carried out simultaneously with aeration.

The gas discharge pipe 61 is provided at a point halfway along the entire length thereof with an empty part 62 which is capable of being charged with an adsorbent agent such as, for example, activated carbon. A water discharge pipe 63, a switch valve 64, a drain vent 65, and a filter 66 are disposed as illustrated.

The apparatus for treatment constructed as mentioned above is suitable for treating the effluent from dry cleaning in which the effluent occurs in an amount in the range between 1 and 10 liters/day and contains tetrachloroethylene in a concentration of about 50 mg/liter. The amount of hydrogen peroxide which is sufficiently added to the reaction system is in a range between 0.05 and 2% by weight, based on the amount of the effluent under treatment.

EXAMPLES

Now, the present invention will be described more specifically below with reference to examples, but it should be noted that the present invention is not limited to these examples.

Example 1

Figure 2:
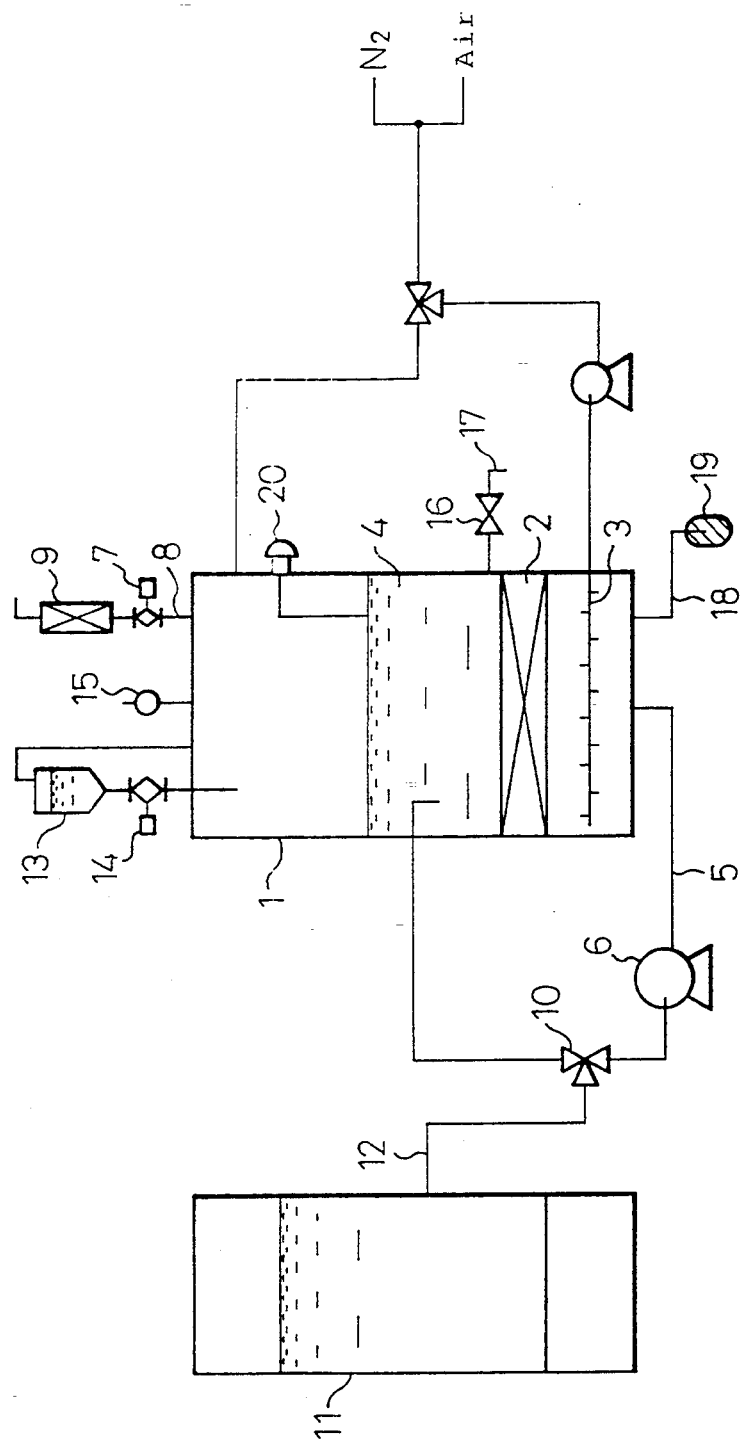
FIG. 2 is a diagram illustrating a specific example of the apparatus for executing the first aspect of the present invention.

In an apparatus as illustrated in FIG. 2, 6 liters of tetrachloroethylene having an initial concentration of 62 mg/liter was placed and 360 g of a porous iron type metallic article having a mesh size of No. 13 was set in place. With a vessel kept in a tightly closed state, the effluent under treatment was circulated at 20° C. for three hours. The effluent which had undergone the first step involving addition of 1.5% by weight of hydrogen peroxide had a residual tetrachloroethylene content shown in Table 1.

Then, the vessel was set in an open state and the second step was carried out by introducing air into the vessel to expel the carbon dioxide gas as the reaction product, circulating the effluent under treatment, and adding thereto 0.75% by weight of hydrogen peroxide.

The effluent, after the second step, had a very low residual tetrachloroethylene content as shown in Table 1, indicating that the treatment had removed a very large proportion of the persisting tetrachloroethylene. The treated effluent, on being neutralized with NaOH to pH 7.4, showed a Fe ion concentration of 9.3 mg/liter, a value below the tolerable level fixed by the environmental regulations.

TABLE 1

| Step | Length of treatment (hr) | Residual tetrachloroethylene content (mg/liter) |
|---|---|---|
| 1 | 0 | 65 |
|   | 0.5 | 20 |
|   | 1 | 13 |
|   | 1.5 | 10 |
|   | 2 | 8 |
|   | 2.5 | 6 |
|   | 3 | 5 |
| 2 | 3.5 | 0.25 |
|   | 4 | 0.15 |
|   | 4.5 | 0.10 |
|   | 5 | 0.08 |

Example 2

The treatment of the effluent through the first and the second step was carried out by following the procedure of Example 1. When the spent aerating gas arising in the second step was treated with silica gel inserted in the gas discharge conduit 7, the discharged gas was substantially free from odor and had a residual organic chlorine compound content of less than 0.1 ppm.

Example 3

Figure 3:
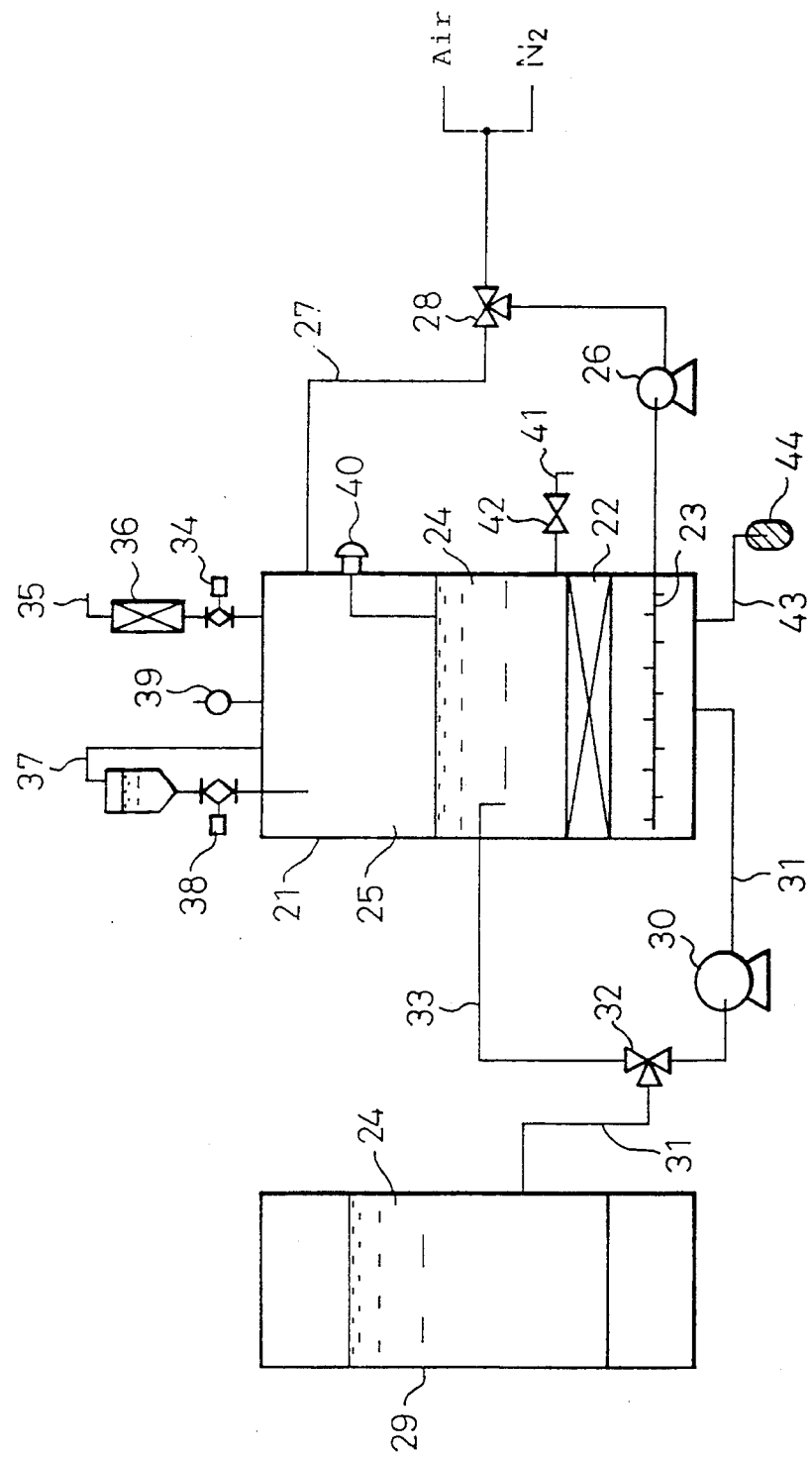
FIG. 3 is a diagram illustrating a specific example of the apparatus for executing the second aspect of the present invention.

In an apparatus constructed as illustrated in FIG. 3, six liters of an effluent containing tetrachloroethylene in an initial concentration of 68 mg/liter was placed and 360 g of a porous iron type metallic article having a mesh size of No. 13 was set in place. With the vessel kept in a closed state, the effluent was treated under continued circulation of the gaseous phase at 20° C. for seven hours. The treated effluent showed a residual tetrachloroethylene content as shown in Table 2.

At the outset of the treatment, $H_2O_2$ was added in an amount of 1.5% by weight. After the elapse of three hours following the start of the treatment, $H_2O_2$ was added by way of replenishment in an amount of 0.75% by weight.

Example 4

The treatment following the procedure of Example 3 was carried out for three hours. Then, the treatment was continued for a total of five hours, with the vessel 21 kept in an open state, the aerating means 23 kept in operation, and $H_2O_2$ added in an amount of 0.75% by weight. The treated effluent had a residual tetrachloroethylene content as shown in Table 2.

TABLE 2

| Length of treatment (hr) | Residual tetrachloroethylene content (mg/liter) | |
|---|---|---|
| | Example 3 | Example 4 |
| 0 | 82 | 68 |
| 0.5 | 32 | 25 |
| 1 | 17 | 16 |
| 1.5 | 12 | 11 |
| 2 | 8 | 7 |
| 2.5 | 5 | 5 |
| 3 | 3 | 3 |
| 3.5 | 1.3 | 0.2 |
| 4 | 0.8 | 0.1 |
| 4.5 | 0.4 | 0.08 |
| 5 | 0.2 | 0.07 |
| 6 | 0.1 | — |
| 7 | 0.09 | — |

Example 5

Figure 4:
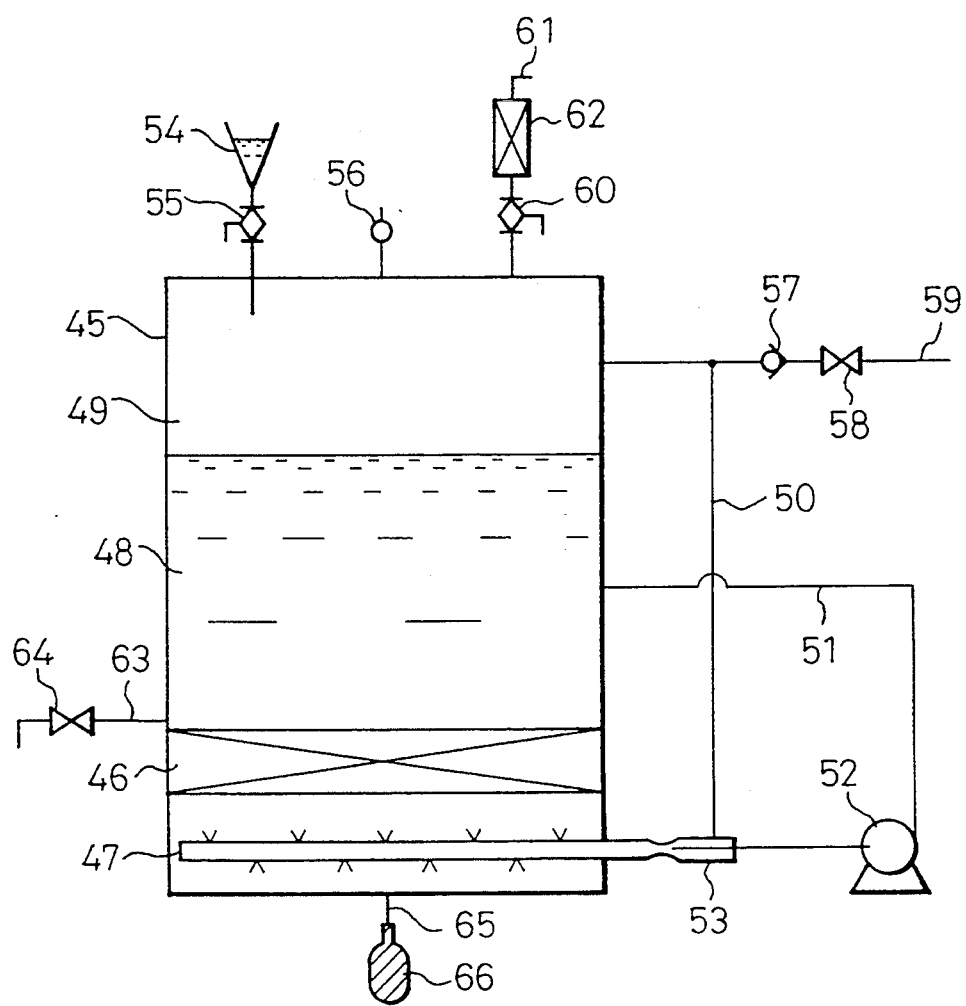
FIG. 4 is a diagram illustrating a specific example of the apparatus for executing the third aspect of the present invention.

In an apparatus constructed as illustrated in FIG. 4, 6 liters of an effluent containing tetrachloroethylene in an initial concentration of 62 mg/liter was placed and 360 g of a porous iron type metallic article having a mesh size of No. 13 was set in place. With the vessel kept in a closed state, the effluent was circulated therein at 20° C. for seven hours. Hydrogen peroxide was added in an amount of 1.5% by weight for the first step. After three hours had elapsed from the outset of the treatment, $H_2O_2$ was added in an amount of 0.75% by weight by way of replenishment. The treated effluent had a residual tetrachloroethylene content as shown in Table 3.

Example 6

The reaction following the procedure of Example 5 was carried out for 3 hours. Then, the treatment was continued with the vessel kept in an open state, the aerating means 48 kept in operation, and hydrogen peroxide added in an amount of 0.75% by weight. The treated effluent showed a residual tetrafluoroethylene content as shown in Table 3.

TABLE 3

| Length of treatment (hr) | Residual tetrachloroethylene content (mg/liter) | |
|---|---|---|
| | Example 5 | Example 6 |
| 0 | 61 | 76 |
| 0.5 | 22 | 29 |
| 1 | 14 | 17 |
| 1.5 | 8 | 14 |
| 2 | 4 | 9 |
| 2.5 | 3 | 6 |
| 3 | 2 | 4 |
| 4 | 0.7 | 0.3 |
| 5 | 0.4 | 0.08 |
| 6 | 0.2 | — |
| 7 | 0.09 | — |

INDUSTRIAL APPLICABILITY

As mentioned above, according to the first aspect of the present invention, the treatment with a porous iron type metallic article and hydrogen peroxide permits efficient utility of hydrogen peroxide and the second step performed by the use of an aerating means after the first step effects decomposition and removal of the organic chlorine compound contained in the effluent under treatment and enables the organic chlorine compound content thereof to be lowered to an extremely small concentration.

According to the second and the third aspect of the present invention, the treatment by the use of a porous iron type metallic article and hydrogen peroxide permits efficient utility of hydrogen peroxide and, at the same time, the circulation of the gaseous phase to the Fenton reaction system ensures effective decomposition and removal of the organic chlorine compound contained in the effluent and lowers the organic chlorine content to an extremely small concentration.

We claim:

1. A method for treatment of an effluent containing an organic chlorine compound in the presence of a porous iron type metal article and hydrogen peroxide thereby effecting oxidizing decomposition and removal of said organic chlorine compound, said method comprising:

using said porous iron type metal article, together with $H_2O_2$, for supplying iron ions to Fenton's reaction by:
providing a closed vessel having an interior with said porous iron type metal article disposed in the interior of said closed vessel and providing means in an upper portion of the closed vessel for selectively opening and closing communication of the interior of the closed vessel with outside atmosphere;
disposing effluent containing said organic chlorine compound in the interior of the vessel, with said effluent having said hydrogen peroxide added thereto;
a first step performed with the interior of the vessel closed to outside atmosphere comprising circulating said effluent containing said organic chlorine compound with said hydrogen peroxide added thereto disposed in the interior of said vessel through said porous iron type metal article; and
a second step comprising opening the interior of said closed vessel to communicate with outside atmosphere and simultaneously aerating said effluent while continuing circulation of said effluent, thereby effecting oxidizing decomposition of said organic chlorine compound.

2. A method as claimed in claim 1, wherein during said second step, spent gas containing residual organic chlorine compound collects in the upper part of the interior of said vessel and said residual organic chlorine in said spent gas is subjected to adsorption and decomposition of said residual organic chlorine compound.

3. An apparatus for treatment of an effluent containing an organic chlorine compound having hydrogen peroxide added thereto, comprising:

a closed vessel having an interior and an upper part and a lower part;
a porous iron type metallic article disposed in the interior of said closed vessel between said upper part and said lower part, said porous iron type metallic article having an upper surface facing said upper part of said closed vessel and a lower surface facing said lower part of said closed vessel;
means for circulating said effluent containing hydrogen peroxide, said means including a circulation path having a first end communicating with the interior of said closed vessel below the lower surface of said porous type metallic article and a second end communicating with the interior of said closed vessel above the upper surface of said porous iron type metallic article;
whereby said porous iron type metal article, together with $H_2O_2$, supplies iron ions to Fenton's reaction;
an aeration device disposed in the interior of said closed vessel below the lower surface of said porous iron type metallic article; and
means located at the upper part of said closed vessel for selectively opening and closing communication of the interior of said closed vessel with outside atmosphere.

4. A method for treatment of an effluent containing an organic chlorine compound in the presence of a porous iron type metallic article and hydrogen peroxide thereby effecting oxidizing decomposition and removal of said organic chlorine compound, said method comprising:

using said porous iron type metal article, together with $H_2O_2$, for supplying iron ions to Fenton3 s reaction by:
providing a closed vessel having an upper part, a lower part, and an interior;
disposing said porous iron type metallic article in the interior of said closed vessel between said upper part and said lower part;
placing said effluent containing organic chlorine compound in said interior of said closed vessel, with hydrogen peroxide added to said effluent;
circulating said effluent containing organic chlorine compound with hydrogen peroxide added thereto through said porous iron type metallic article, wherein a gaseous phase forms and stagnates in the upper part of the interior of said closed vessel above said effluent;
causing said gaseous phase stagnating above said effluent to be introduced into said effluent.

5. A method as claimed in claim 4, further comprising:

providing means at the upper part of said closed vessel for selectively opening and closing communication of the interior of said closed vessel with outside atmosphere;
opening said interior of said closed vessel to communication with outside atmosphere while simultaneously aerating said effluent containing organic chlorine compound with hydrogen peroxide added thereto.

6. A method as claimed in claim 5 further comprising continuing circulation of said effluent through said porous iron type metallic article while simultaneously aerating said effluent.

7. An apparatus for treatment of an effluent containing an organic chlorine compound having hydrogen peroxide added thereto, comprising:

a closed vessel having an upper part, a lower part, and an interior for receiving said effluent;
a porous iron type metallic article having an upper surface facing the upper part of said closed vessel and a lower surface facing the lower part of said closed vessel disposed in said interior of said closed vessel between said upper and lower part of said closed vessel;
means for causing a gaseous phase formed in the interior of said closed vessel above effluent received by said closed vessel to be introduced into said effluent;

an aeration device disposed in the interior of said closed vessel below the lower surface of said porous iron type metallic article;

gas discharge means communicating with the interior of said closed vessel disposed at the upper part of said closed vessel, said gas discharge means including valve means for selectively opening and closing communication of the interior of said closed vessel with outside atmosphere; and means for adding hydrogen peroxide to effluent received by the interior of said closed vessel, said hydrogen peroxide adding means being located at the upper part of said closed vessel;

whereby said porous iron type metal article, together with $H_2O_2$, supplies iron ions to Fenton's reaction.

8. A method for treatment of an effluent containing an organic chlorine compound in the presence of a porous iron type metallic article and hydrogen peroxide thereby effecting oxidizing decomposition and removal of said organic chlorine compound, said method comprising:

using said porous iron type metal article, together with $H_2O_2$, for supplying iron ions to Fenton's reaction by:

providing a closed vessel having an interior containing said effluent containing said organic chlorine compound with hydrogen peroxide added thereto;

causing forced circulation of said effluent containing said organic chlorine compound with said hydrogen peroxide added thereto within said closed vessel;

causing a gaseous phase containing the organic chlorine compound formed in an upper part of the interior of said closed vessel to be forcibly introduced into said circulated effluent; and providing pump means for providing force to cause both said forced circulation of said effluent and forced introduction of said gaseous phase into said circulated effluent.

9. An apparatus for treatment of an effluent containing an organic chlorine compound having hydrogen peroxide added thereto, comprising:

a closed vessel having an upper part, a lower part, and an interior for receiving said effluent;

a porous iron type metallic article having an upper surface facing the upper part of said closed vessel and a lower surface facing the lower part of said closed vessel disposed in the interior of said closed vessel between said upper and lower parts of said closed vessel;

an effluent circulation path for said effluent containing hydrogen peroxide, said path having a first end connected to the interior of said closed vessel above the upper surface of said porous iron type metallic article and below an upper surface of effluent received in the interior of said closed vessel;

whereby said porous iron type metal article, together with $H_2O_2$, supplies iron ions to Fenton's reaction;

a gas circulation path having a first end connected to the interior of said closed vessel above the upper surface of said porous iron type metallic article and above the upper surface of effluent received in the interior of said closed vessel;

pump means disposed in said effluent circulation path, said pump having an intake end and a discharge end;

an ejector means disposed in said effluent circulation path downstream from the discharge end of said pump means;

a second end of said gas circulation path connected to said ejector means; and aerating means disposed in the interior of said closed vessel below the lower surface of said porous iron type metallic article, said aerating means connected to said ejector means.

10. An apparatus as claimed in claim 9 which further includes:

an aerating gas feed pipe means connected to said gas circulation path between the first end and the second end of said gas circulation path, said aerating gas feed pipe means including a check valve and an on-off valve.

* * * * *